United States Patent
Kang et al.

(10) Patent No.: US 7,170,503 B2
(45) Date of Patent: Jan. 30, 2007

(54) LAYER EDITING METHOD AND APPARATUS IN A PEN COMPUTING SYSTEM

(75) Inventors: Min-Jeong Kang, Suwon-shi (KR); Gi-Sang Lee, Suwon-shi (KR); Eun-O Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 528 days.

(21) Appl. No.: 10/668,625

(22) Filed: Sep. 23, 2003

(65) Prior Publication Data

US 2004/0075652 A1 Apr. 22, 2004

(30) Foreign Application Priority Data

Oct. 17, 2002 (KR) ............ 10-2002-0063581

(51) Int. Cl.
*G09G 5/00* (2006.01)
(52) U.S. Cl. ............ 345/173; 345/179; 715/531; 715/864
(58) Field of Classification Search ........ 345/156–179; 715/512, 530, 531, 541, 864
See application file for complete search history.

(56) References Cited

U.S. PATENT DOCUMENTS

| 5,297,216 | A | | 3/1994 | Sklarew |
| 5,666,139 | A | | 9/1997 | Thielens et al. |
| 5,864,636 | A | * | 1/1999 | Chisaka ............... 382/189 |
| 5,893,126 | A | * | 4/1999 | Drews et al. ............ 715/512 |
| 2003/0001899 | A1 | * | 1/2003 | Partanen et al. ........ 345/800 |
| 2003/0071850 | A1 | * | 4/2003 | Geild ...................... 345/781 |

FOREIGN PATENT DOCUMENTS

JP 06195334 A * 7/1994

* cited by examiner

*Primary Examiner*—Alexander Eisen
(74) *Attorney, Agent, or Firm*—The Farrell Law Firm

(57) ABSTRACT

An editing apparatus and an editing method in a pen computing system using a whole display screen as an input window. Edited information written or drawn by a user on a transparent layer, which is displayed over original text, is stored as a picture or translated into computer-processible recognition data. Each transparent layer has a layer identifier. The user can display multiple layers over the original text by selecting layer identifiers to reflect layer information in a picture form or in a computer code form. The layer information, if demanded by the user, can be combined with the original text in order to generate edited text.

20 Claims, 7 Drawing Sheets

LAYER EDITING METHOD AND APPARATUS IN A PEN COMPUTING SYSTEM

PRIORITY

This application claims priority to an application entitled "Layer Editing Method and Apparatus in a Pen Computing System" filed with the Korean Intellectual Property Office on Oct. 17, 2002 and assigned Serial No. 2002-63581, the contents of which are hereby incorporated by reference.

BACKGROUND OF THE INVENTION

1. Field of the Invention

The present invention relates to a layer editing method and apparatus in a pen computing system.

2. Description of the Related Art

Computers, PDAs, mobile terminals, and similar devices are generally configured to enable a user to input text, data, or computer commands using a physical keypad. Recently, touch screen panels (TSP) have been adopted for use with such devices, in order to provide an alternative method of inputting information. When compared to information input by a keypad, information input by a touch screen panel is convenient and greatly enhances the user's experience. In addition, touch screen panels may be used to efficiently input information into small information processing terminals such as PDAs and mobile terminals where a key input device is not practical.

Conventional input devices having a touch screen panel detect a trail left on the touch screen panel by a writing instrument such as a stylus. The device recognizes a character or a symbol corresponding to the trail and converts the recognized character or symbol into a predetermined computer code.

A method of editing text by writing is described in U.S. Pat. No. 5,297,216 issued to Sklarew. According to this patent, when an insert symbol is written on a screen displaying original text, a popup window for insertion is created so that the user can write characters or symbols in the window.

According to U.S. Pat. No. 5,297,216, if the user writes an editing symbol on a screen displaying original text, an editing apparatus recognizes the symbol and pops-up a separate window for insertion over the original text. The user can then write additional characters and symbols in that window. The editing apparatus recognizes the handwritten characters or symbols and then translates them into font symbols. The editing apparatus allows the user to confirm the font symbols. Upon confirmation by the user, the editing apparatus inserts the font symbols into the original text. U.S. Pat. No. 5,666,139, issued to Thielens, provides for a popup window for editing text, wherein the pop-up window takes the form of a writing pad.

In the prior art editing apparatus described above, it is time consuming to request and display a popup window for editing text. Also, it is inconvenient for a user to write characters or symbols within the limited area of the pop-up window. It is a further disadvantage that the editing apparatus fails to recognize characters or symbols entered outside of the window. In addition, the conventional editing apparatus, as described above, only stores text in a final edited form. Thus, where text was edited several times, a user cannot confirm which changes were made to the text at each editing step.

SUMMARY OF THE INVENTION

Accordingly, the present invention has been made to solve the above-mentioned problems occurring in editing apparatus as per the prior art. An object of the present invention is to provide a layer editing method and apparatus in a pen computing system, which can display handwritten changes over original text.

Another object of the present invention is to provide a layer editing method and apparatus in a pen computing system, which can edit original text by translating characters or symbols written by a user into a form that may be processed by a computer.

Yet another object of the present invention is to provide a layer editing method and apparatus wherein a user can view and confirm changes that have been made to a text at any given editing step.

In order to accomplish the above objects, there is provided an apparatus for executing an editing command in a pen computing system, which comprises: a display screen for displaying original text to be edited; a layer generating means for generating a transparent layer having a layer identifier in response to a layer editing command; a memory for storing a trail written on said display screen, together with corresponding positional information; and a control section for displaying the generated transparent layer over the original text, sensing a pen input, outputting a trail of the sensed pen input, and storing the trail and the positional information in said memory.

An editing apparatus according to the present invention comprises a transparent input screen (i.e., a transparent touch screen) placed over a display screen, and a related electronic device and a pen for inputting data.

As the user writes alphanumeric or other characters or symbols on the transparent input screen, the characters or symbols are represented by a trail of points emulating an input written with a pen on a paper. Once discrete characters or symbols are completed, they are translated into computer code or computer commands that can be displayed on the display screen. The editing apparatus of the present invention analyzes handwritten symbols, and translates them into computer-processible recognition data, such as font symbols, editing symbols, special characters, or lexigrams. Respective recognition data can be stored separately.

For the purpose of maintaining consistency throughout this disclosure, the area on the surface of the transparent input screen will be referred to as the "transparent layer." The user can edit original text displayed on the display screen by writing characters or editing symbols on the transparent layer, which is located directly on the display screen. The user can edit the original text displayed on the display screen by writing characters or symbols on the transparent layer to overlap the original text, in a similar manner to the manual editing of paper printing using transparent paper. The handwritten characters or symbols may be displayed in a different color or font for the purpose of distinguishing them from the original text. Preferably, the transparent layer has the same text format as the original text.

The editing apparatus according to the present invention senses an input by the user with a pen on a transparent layer, i.e. pen movement on the transparent, displays the trail of the input on the display screen, and stores the trail information and corresponding positional information on the transparent input screen as a single layer of data.

As used herein, a "handwritten symbol" is a symbol written by the user on a transparent layer. An "editing symbol" is a symbol, which is intended, when recognized, to cause the computer to execute a particular editing function, such as insert text, delete text, delete a letter, or move a margin. An editing symbol, if recognized by the editing apparatus, is translated into a corresponding command in order to perform an editing function. A "font symbol" is a computer-generated symbol, which represents a handwritten symbol in a predetermined font format.

Changes made to original text can be stored exactly as the user wrote them with a pen-like stylus on the transparent layer. Alternatively, the editing apparatus can recognize handwritten symbols (including editing symbols) and store text in edited form, i.e., text generated by the editing apparatus. In the former case, trail information left by handwriting is stored together with corresponding positional information. In the latter case, the handwritten symbols, when recognized, are translated into computer-processible recognition data such as editing symbols or font symbols, so that only editing information is stored. The editing information can be stored to correspond to a transparent layer. In other words, the editing apparatus according to the present invention stores trail information written on a transparent layer by the user together with corresponding positional information. The editing apparatus, when recognizing editing symbols written by the user on original text, assigns an index (a footnote number) to each editing symbol at each corresponding position on the original text, and displays the change corresponding to each index on the original text. If changes were made to the original text several times, the editing apparatus can provide the user with separate information about each change made.

The editing apparatus of the present invention also provides for the correction of errors resulting from the incorrect translation of user inputted symbols. For example, the editing apparatus can display the written symbols and the recognized codes on the display screen, so that the user may compare them. If the user decides that the recognized codes are incorrect, the editing apparatus can provide a separate window on the display screen for another input by the user.

Also, if several changes are made to original text, one transparent layer for each change is generated. Transparent layers have respective layer identifiers and can be stored separately from one another. Each edit of text is indexed and stored separately according to its layer identifier. In other words, a transparent layer, if generated, is stored separately with an identifier. In addition, each part of the text edited on each transparent layer can be stored separately. Image information stored according to a layer identifier and recognition data are compressed by a predetermined compression algorithm and stored in the memory.

A plurality of transparent layers can be displayed sequentially and simultaneously over the original text displayed on the display screen. The editing apparatus will display the original text on the display screen and lay transparent layers stored by the user sequentially over the original text. To be specific, the editing apparatus will display the original text as an image on the display screen and will display over the image any change inputted on any transparent layer, such as trail information written by the user over the image so as to be overlapped with each other. As mentioned above, trail information can be displayed in a different color.

In addition, the editing apparatus may display a second transparent layer over a first transparent layer and the original text. In this manner, the editing apparatus of the present invention can display a plurality of transparent layers over the original text.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. In the following description of the present invention, a detailed description of known functions and configurations will be omitted when it may make the subject matter of the present invention unclear.

Figure 1:
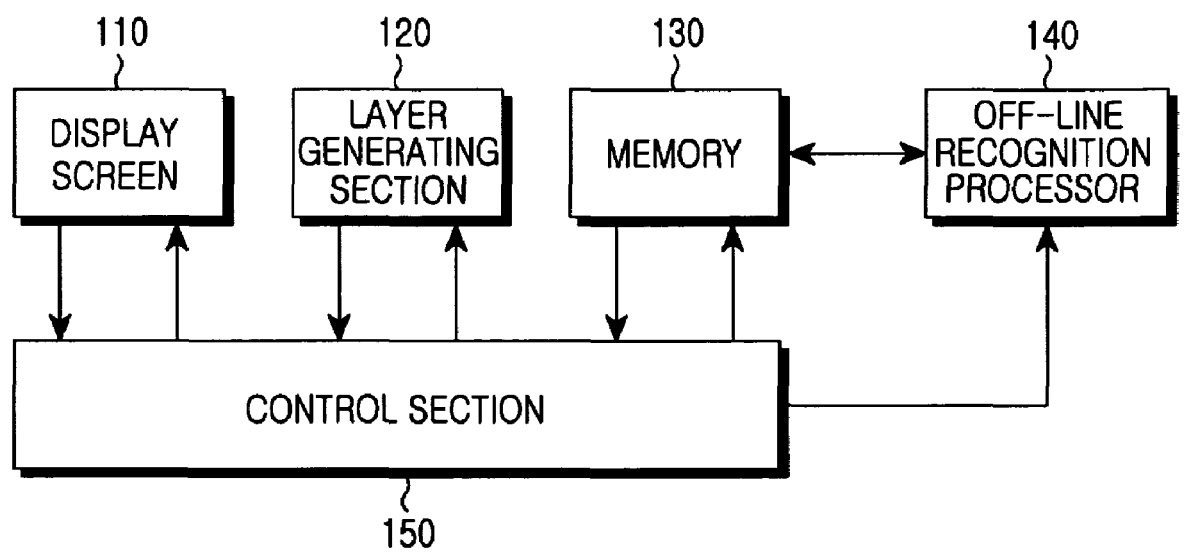
FIG. 1 is a block diagram showing the construction of an editing apparatus according to a first embodiment of the present invention.

FIG. 1 shows the construction of an editing apparatus according to a first embodiment of the present invention. Referring to FIG. 1, an editing apparatus according to the present invention comprises a display screen 110, a layer generating section 120, a memory 130, an off-line recognition processor 140 and a control section 150. The display screen 110 displays various images or text under the control of the control section 150. When an editing command is executed according to the present invention, original text to be edited is displayed on the display screen. Also, the display screen 110 can display a plurality of layers over the original text, under the control of the control section.

The layer generating section 120 forms a transparent layer on a transparent input screen placed directly over the display screen, in order for a user to edit original text. The user can edit original text by writing on the transparent layer. As described above, any change inputted on the transparent layer can be stored exactly as the user wrote it with a pen-like stylus on the transparent layer. Trail information written on the transparent layer is stored in the memory 130, together with its corresponding positional information. The layer generating section 120 can be a transparent input screen, i.e., a transparent touch screen, disposed on the display screen.

The memory 130 stores data concerning transparent layers. Transparent layers are identified, indexed, and stored using a layer identifier. Each transparent layer has an index and can be selectively accessed by the user. The memory 130 stores any change to original text having been made on a transparent layer exactly as the change was written on the transparent layer by the user with the pen-like stylus. The memory 130 stores trail information written by the user on a transparent layer, together with corresponding positional information on the original text. The positional information includes trail information stored as an image as well as the position of the trail on the transparent layer, i.e., the starting coordinate of the trail.

If the user writes a character or a symbol with a stylus on a transparent layer, a plurality of locating signals representative of a plurality of corresponding positional coordinates will be provided to the control section 150. The control section 150 recognizes a stream of locating signals and stores these signals in the memory 130. Also, the control section 150 provides a plurality of corresponding display signals to the display screen 110. The control section 150 stores in the memory 130 any change to the original text having been made on a transparent layer as an image, exactly as it was written by the user on the transparent layer. If changes were made to the original text several times, the control section 150 individually identify each of the plurality of layers, corresponding to a change, and stores the layers in the memory 130. At this time, the control section 150 assigns a layer identifier to each transparent layer.

Also, the control section 150 assigns a footnote number to each change made to original text by the user at the corresponding position of the original text, and displays the change corresponding to each footnote number over the original text. If changes were made to the original text several times, the editing apparatus can provide the user with information about the time when each change was made.

If a command is executed by the user for displaying a plurality of layers over the original text, the control section 150 will sequentially display transparent layers having corresponding layer information over the original text according to their layer identifiers, thereby forming multiple simultaneous layers over the original text.

Referring again to FIG. 1, the editing apparatus of the present invention may include an off-line recognition processor 140 which can analyze symbols written by the user and translate them into computer-processible recognition data, such as font symbols, editing symbols, special characters, or lexigrams. The off-line recognition processor 140 receives any change made by the user as an image from the memory 130, translates the image into computer-processible data, and provides the data to the control section 150. The off-line recognition processor 140 can be provided independently from the editing apparatus of the present invention.

If the user writes a character or a symbol with a stylus, such as a pen, on a transparent layer, the control section 150 will receive a plurality of locating signals representative of a plurality of corresponding positional coordinates. The control section 150 stores these signals in the memory 130 and provides them to the off-line recognition processor 140. The off-line recognition processor 140 recognizes written symbols and translates them into computer text, including font symbols. Alternatively, the off-line recognition processor 140 recognizes editing symbols and translates them into corresponding computer commands.

When the off-line recognition processor 140 recognizes written symbols and translates them into computer-processible recognition data, such as font symbols, editing symbols, special characters or lexigrams, the control section 150 allows the user to check the recognized codes and correct any error in the codes. For example, the control section 150 can list and display the written symbols and the recognized codes from the off-line recognition processor 140 on the display screen. If the user determines that the recognized codes are incorrect, the control section 150 can provide a separate window on the display screen for another input by the user.

If a command is executed by the user to incorporate a change to original text, the control section 150 will receive computer-processible recognition data from the off-line recognition processor 140 and will apply editing information selected by the user to the original text in order to provide edited text. If changes were made to the original text several times, the control section 150 will store editing information corresponding to each change separately in the memory 130.

Figure 2:
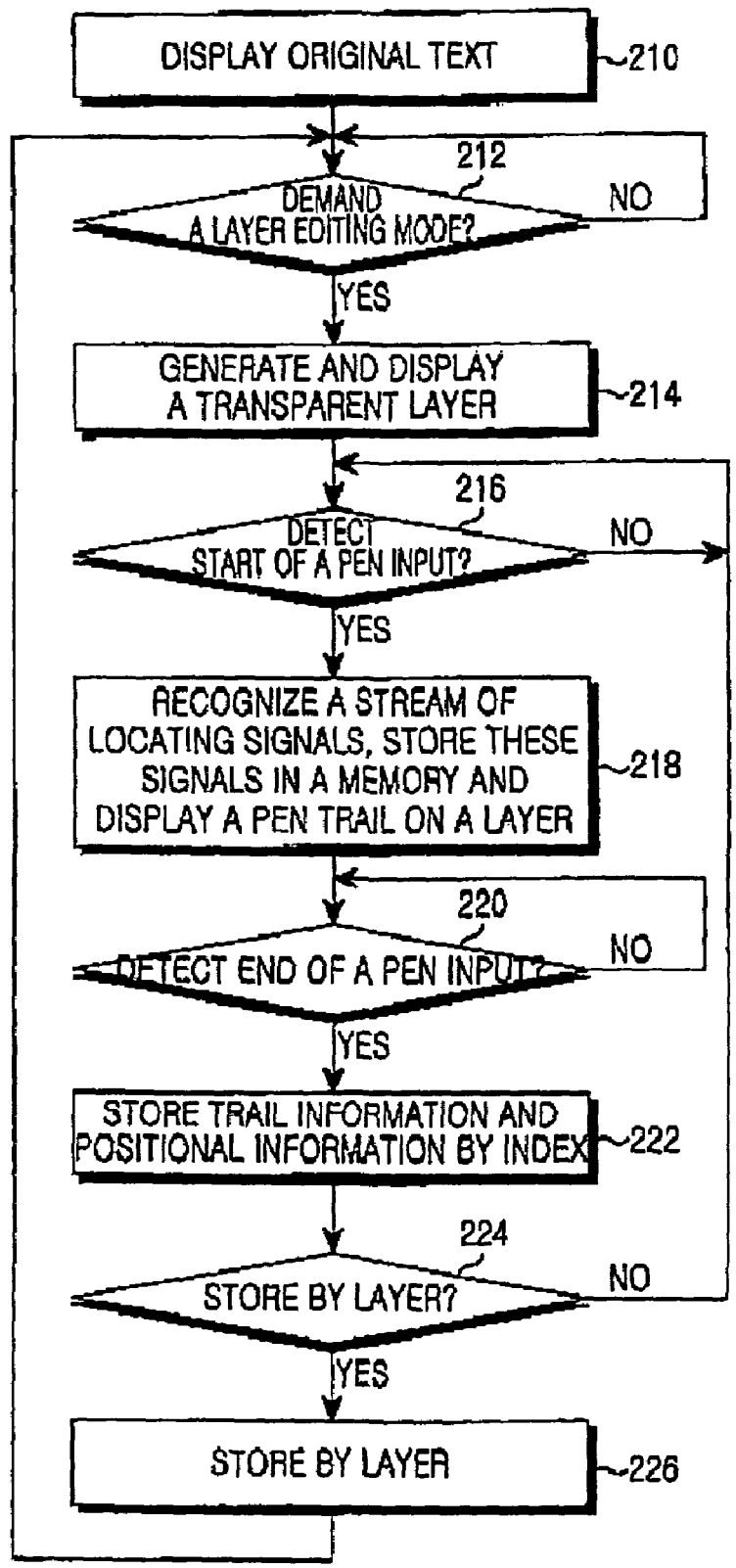
FIG. 2 is a flow chart showing the processing of a layer editing mode according to the first embodiment of the present invention.

FIG. 2 is a flow chart showing the processing of a layer editing mode according to the first embodiment of the present invention. Referring to FIGS. 1 and 2, the control section 150 of the editing apparatus displays original text on the display screen 110 at step 210. At step 212, the control section 150 determines whether the user demands a layer editing mode to edit the original text. Although not shown in FIG. 2, one embodiment allows the user to select a layer editing mode using a predetermined input means (for example, soft keys on a touch screen or keys on a keypad). In an alternate embodiment, if the user writes an editing symbol with a stylus on the transparent input screen, the control section 150 will recognize that the user has edited a layer. In a layer editing mode, the control section 150 commands the layer generating section 120 to generate and display a transparent layer at step 214. Accordingly, the layer generating section 120 forms a transparent layer on the transparent input screen placed over the display screen.

As described above, the layer generating section 120 can be a transparent touch screen disposed on the display screen. Subsequently, the control section 150 detects whether the user has initiated a pen input on a transparent layer. If the user enters into a layer editing mode by writing with the stylus directly on the transparent input screen, the detecting step can be omitted. If the user edits the original text by writing with the stylus on a transparent layer, the control section 150 will receive a plurality of locating signals representative of a plurality of corresponding positional coordinates from the layer generating section 120. At step 218, the control section 150 recognizes a stream of locating signals and stores these signals in the memory 130. Also, the control section 150 provides a plurality of corresponding display signals to the display screen 110 so that a pen trail can be displayed on the layer.

At step 220, the control section 150 determines whether stylus input has been completed. If no stylus input is made after a predetermined period of time, the control section 150 will decide that the input has been completed. Alternatively, if the user inputs an editing mode termination symbol, the control section 150 will decide that a pen input has been completed. At step 222, the control section 150 stores trail information generated by a pen input in the memory 130, together with corresponding positional information on the display screen. More specifically, any change made on a transparent layer can be stored exactly as written by the user with the stylus on the transparent layer. At this time, trail information written on the transparent layer is stored in the memory 130, together with corresponding positional information from the display screen. The control section 150 assigns an index to each editing symbol written by the user over the original text, and stores changes made to the original text according to their indexes. The control section 150 assigns a footnote number to each editing symbol at a corresponding position on the original text, and displays the change corresponding to each footnote number on the original text.

At step 224, the control section 150 determines whether it is commanded by the user to store a layer. If a layer storage is commanded, the control section 150 will assign a layer identifier to the corresponding layer and will store the layer in the memory 130.

As described above, the control section 150 in this embodiment of the invention can be connected to the off-line recognition processor 140, which is separate from the editing apparatus. The off-line recognition processor 140 recognizes written symbols and translates them into computer text, including font symbols. Alternatively, the off-line recognition processor 140 recognizes editing symbols and translates them into corresponding computer commands. The control section 150 receives computer-processible recognition data from the off-line recognition processor 140 and applies editing information selected by the user to original text in order to provide edited text.

Figure 3:
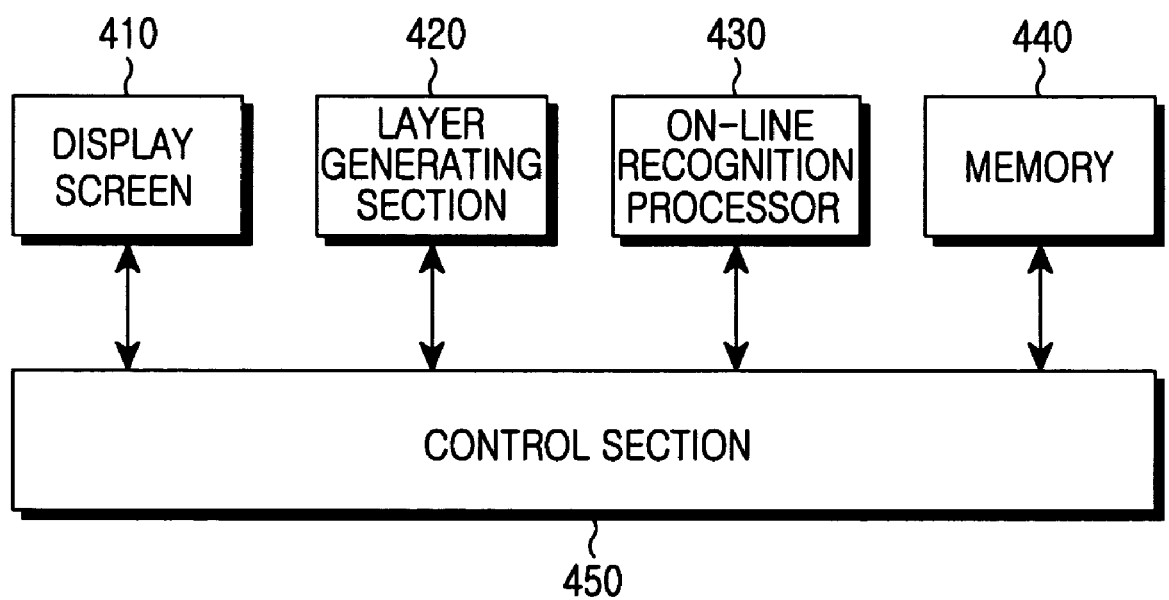
FIG. 3 is a block diagram showing the construction of an editing apparatus according to a second embodiment of the present invention.

FIG. 3 shows the construction of an editing apparatus according to a second embodiment of the present invention. Referring to FIG. 3, an editing apparatus according to the second embodiment of the present invention comprises a display screen 410, a layer generating section 420, an on-line recognition processor 430, a memory 440 and a control section 450. This editing apparatus is similar in construction to the editing apparatus illustrated in FIG. 1, except for the on-line recognition processor 430. Accordingly, the on-line recognition processor 430 will be explained in detail.

In the second embodiment, the editing apparatus comprises the on-line recognition processor 430 which analyzes symbols written by the user and translates them into computer-processible recognition data, such as font symbols, editing symbols, special characters, or lexigrams.

If the user enters a change to original text by writing with a stylus on a transparent layer, the control section 450 will receive a plurality of locating signals representative of a plurality of corresponding positional coordinates and will provide the signals to the on-line recognition processor 430 in real-time. The on-line recognition processor 430 recognizes written symbols in real-time as the user writes them, and translates the written symbols into computer recognition data including font symbols, editing symbols, special characters, and lexigrams. The on-line recognition processor 430 can be integrated in the control section 450 or it can be separate.

The control section 450 recognizes a series of locating signals and stores them in the memory 440. At the same time, the control section 450 provides the on-line recognition processor 430 with a plurality of corresponding display signals to the display screen 410. As a next step, the on-line recognition processor 430 recognizes symbols written by the user and translates them into computer text, including font symbols. Alternatively, the on-line recognition processor 430 recognizes editing symbols and translates them into corresponding computer commands.

When the on-line recognition processor 430 recognizes written symbols and translates them into computer-processible recognition data, such as font symbols, editing symbols, special characters or lexigrams, the control section 450 allows the user to check the recognized codes and correct any error in the codes. For example, the control section 450 can list and display the written symbols and the recognized codes from the on-line recognition processor 430 on the display screen. If the user decides that the recognized codes are incorrect, the control section 450 can provide a separate window on the display screen for another input by the user.

The control section 450 stores text in an edited state, i.e., text generated by the editing apparatus, in the memory 440 according to the data provided by the on-line recognition processor 430. Alternatively, the control section 450 may store in the memory 440 just the editing information which was translated into computer-processible recognition data, such as font symbols or computer commands, depending on the written symbols (including editing symbols). If a command is executed by the user to incorporate any change into original text, the control section 450 will apply editing information selected by the user to the original text in order to provide edited text. If changes were made to the original text several times, the control section 450 will store, in memory 440, editing information corresponding to each change. The memory 440 can store text edited after recognition of written symbols (including editing symbols), i.e., text generated by the editing apparatus, under the control of the control section 450. Also, the memory 440 can store translated computer-processible recognition data, such as editing symbols or font symbols, under the control of the control section 450. Editing information is stored to correspond to a transparent layer.

Figure 4:
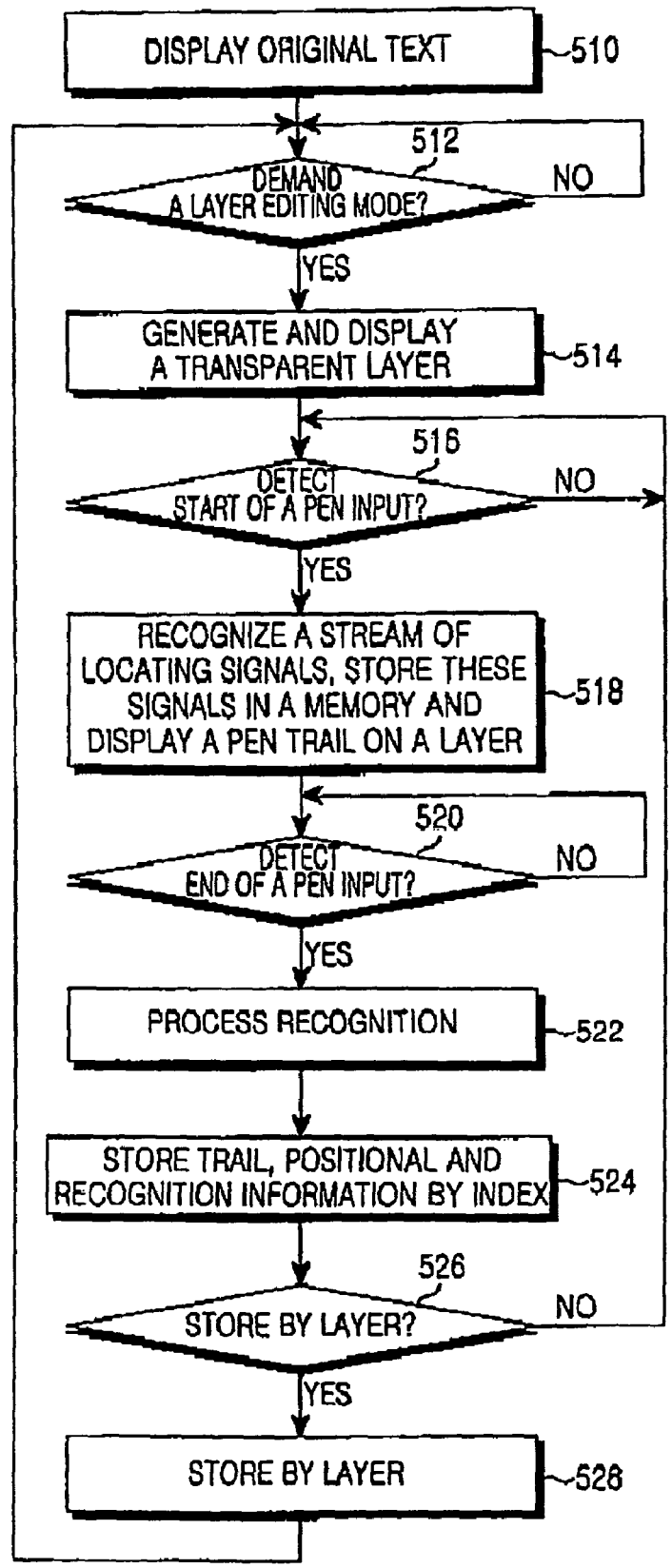
FIG. 4 is a flow chart showing the processing of a layer editing mode according to the second embodiment of the present invention.

FIG. 4 is a flow chart showing the processing of a layer editing mode according to the second embodiment of the present invention. In FIG. 4, processing according to the second embodiment is similar to the processing illustrated in FIG. 2, except for step 522. At step 510, the control section 450 displays original text on the display screen 410. At step 512, the control section 450 determines whether the user demands a layer editing mode to edit the original text. In layer editing mode, the control section 450 controls the layer generating section 420 to generate and display a transparent layer at step 514. At step 516, the control section 450 detects whether the user initiates a pen input on a transparent layer. At step 518, the control section 450 recognizes a stream of locating signals and stores these signals in the memory 440. Also, the control section 450 provides a plurality of corresponding display signals to the display screen 410 so that a pen trail can be displayed on the layer.

At step 520, the control section 450 determines whether a pen input was completed. If a pen input is not made after a predetermined period of time, the control section 450 will decide that the input has been completed. At step 522, the control section 450 controls the on-line recognition processor 430 to translate written symbols (including editing symbols) entered by the user into computer-processible recognition data, such as font symbols or computer commands. At step 524, the control section 450 stores trail information generated by a pen input in the memory 440, together with corresponding positional information on the display screen. Alternatively, the control section 450 may only store computer-processible recognition data. If a command is executed by the user to incorporate any change into original text, the control section 450 will apply editing information selected by the user to the original text in order to provide edited text. The control section 450 can store text in an edited form, i.e., text generated by the editing apparatus, in the memory 440.

At step 526, the control section 450 determines whether the user has requested that a layer be stored. If a layer storage is commanded, the control section 450 will assign a layer identifier to the corresponding layer and will store the layer in the memory 440.

Figure 5:
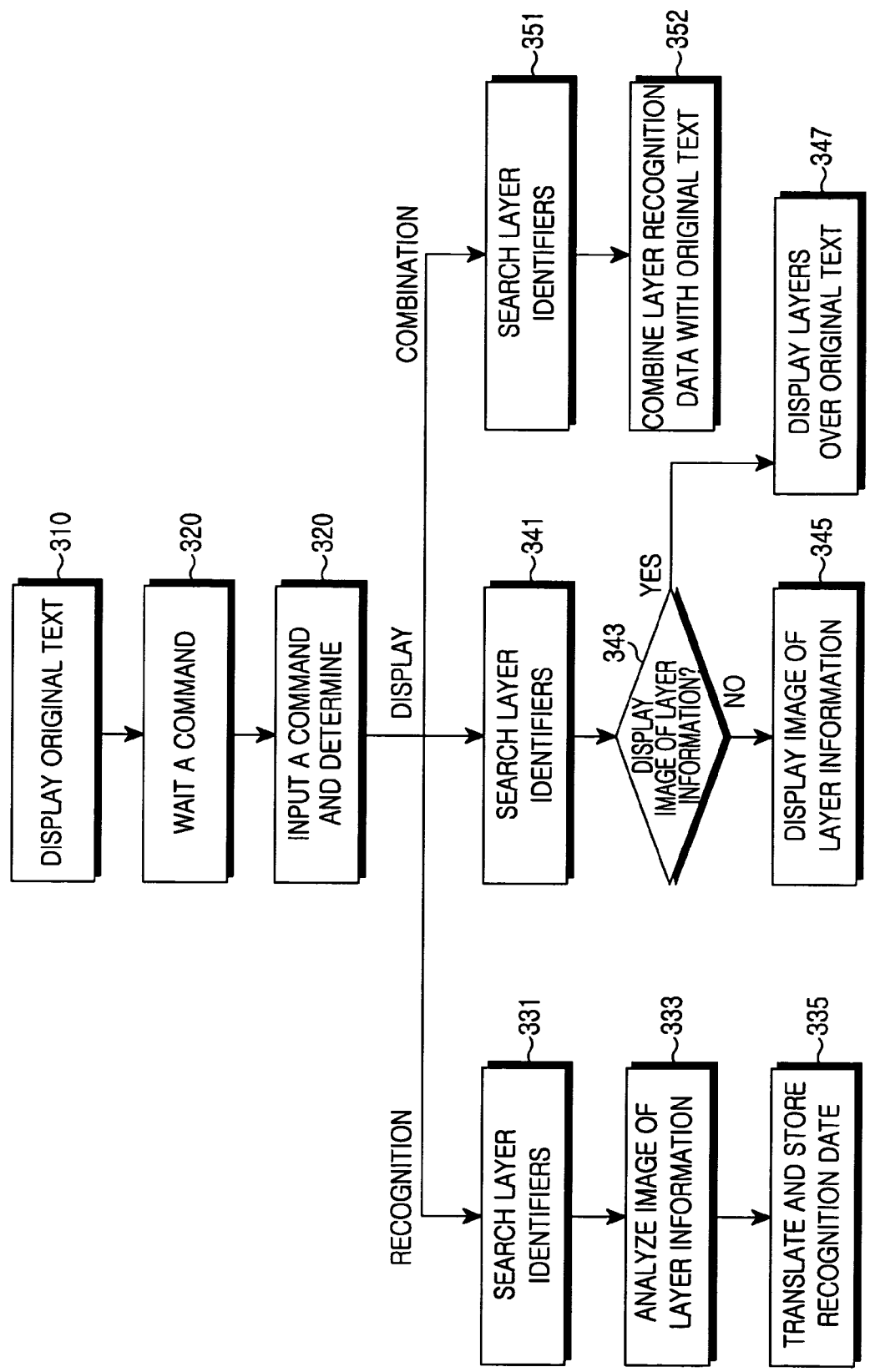
FIG. 5 is a flow chart showing the processing of a layer editing command according to the first embodiment of the present invention.
Figure 6A:
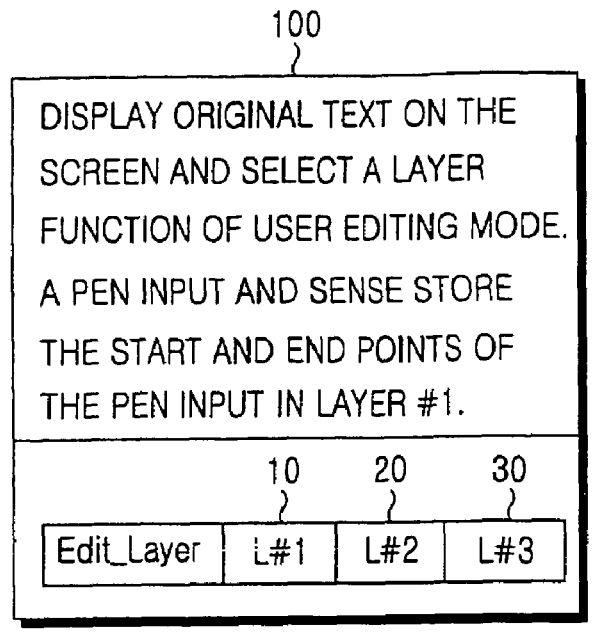
FIGS. 6*a* and 6*b* show a layer editing picture according to the embodiments of the present invention.
Figure 6B:
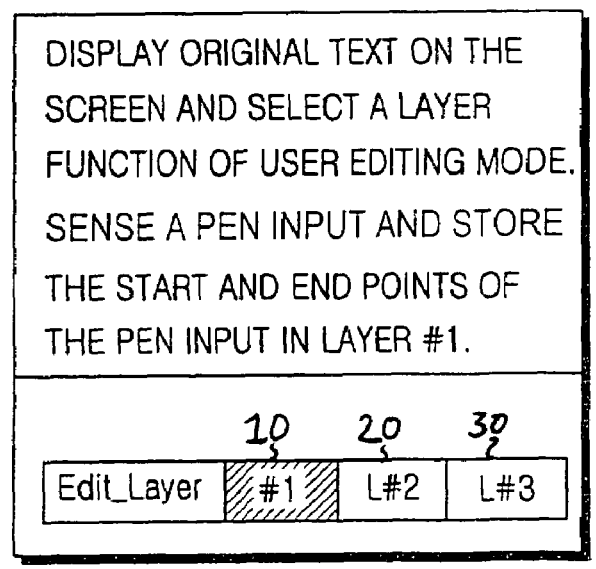

FIG. 5 is a flow chart showing the processing of a layer editing command according to the first embodiment of the present invention. FIGS. 6a and 6b show a layer editing picture according to the embodiments of the present invention.

The editing apparatus of the present invention senses an input with a pen by the user on a transparent layer, displays the trail of the input on the transparent layer, and stores the trail information and corresponding positional information on the transparent input screen as single layer data. The editing apparatus processes original text according to an editing command based on layer information stored by the user. The processing of a layer editing command according to the present invention will be explained in detail.

Referring to FIG. 1 through FIG. 6, at step 310, the control section 150, 450 of the editing apparatus displays original text on the display screen 110, 410 according to the user's command. At step 320, the control section 150, 450 displays commands so that the user can select an editing mode for executing a layer function. In other words, when original text is displayed on the display screen 110, 410, the control section 150, 450 displays commands, which can be selected and executed by the user. If a particular command is inputted by the user, the control section 150, 450 will receive and determine the inputted command at step 320. If a "recognition" command is inputted, the control section 150, 450 will proceed with step 331. If a "display" command is inputted, the control section 150, 450 will proceed with step 341. If a "combine" command is inputted, the control section 150, 450 will proceed with step 351.

If a "recognition" command is selected and inputted by the user, the control section 150, 450 will search layer identifiers and will display the corresponding layers, which were selected by the user at step 331. As described above, the user can select changes made to the original text by layer and display them over the original text. At step 333, the control section 150, 450 controls the recognition processor 140, 430 to analyze images of layer information stored in the memory 130, 440. Accordingly, the recognition processor 140, 430 analyzes written trail information, stored by layer, and translates symbols written by the user (including editing symbols) into computer-processible recognition data, such as font symbols or computer commands. At step 335, the control section 150, 450 stores computer-processible recognition data supplied from the recognition processor 140, 430.

In addition, the control section 150, 450 enables the user to correct any error in the computer-processible recognition codes received from the recognition processor 140, 430. For example, the control section 150, 450 can display a list of written symbols and the recognized codes from the recognition processor 140, 430 on the display screen. If the user decides that the recognized codes are incorrect, the control section 150, 450 can provide a separate window on the display screen for another input by the user.

If a "display" command is selected and inputted by the user, the control section 150, 450 will search layer identifiers and will display corresponding layers to be selected by the user at step 341. If a particular layer is selected by the user, the control section 150, 450 will question at step 343 whether the selected layer is to be displayed over the original text, or whether layer recognition data is to be displayed.

FIGS. 6a and 6b show a layer editing picture according to the present invention. If the original text 100 is displayed on the display screen, the control section 150, 450 will allow the user to select, by layer, any of the changes made to the original text. FIG. 6a shows three layers 10, 20, 30 that are displayed over the original text. The memory 130, 440 stores each layer exactly as was written by the user with a stylus on the layer. As shown in FIG. 6b, if layer #1 (10) is selected by the user, the control section 150, 450 will display any changes to the original text 100 which were made by writing on layer #1, displaying them over the original text 100 at step 347. The control section 150, 450 may only store computer recognition data for each layer at step 345.

If a "combine" command is selected and inputted by the user, the control section 150, 450 will search layer identifiers and will display corresponding layers to be selected by the user at step 351. If a particular layer is selected by the user, the control section 150, 450 will provide text edited by the user according to layer recognition data. The control section 150, 450 can edit the original text according to layer recognition data, for example, computer-processible data such as font symbols, editing symbols, special characters, or lexigrams. As shown in FIG. 6b, the control section 150, 450 edits the original text by inserting computer text corresponding to a handwritten symbol at a position where an insert editing symbol is written and deleting text corresponding to a delete symbol in accordance with the recognition data corresponding to the editing symbols and handwritten symbols representing "insertion" and "deletion."

As described above, since the control section 150, 450 stores trail information written by the user and corresponding positional information on the transparent input screen as single layer data, it can edit the original text based on the corresponding positional information. That is, the trail information written by the user on a transparent layer is stored together with corresponding positional information from the original text.

The positional information includes trail information stored as an image and the position of the trail on the transparent layer, i.e., the starting coordinate of the trail.

Figure 7:
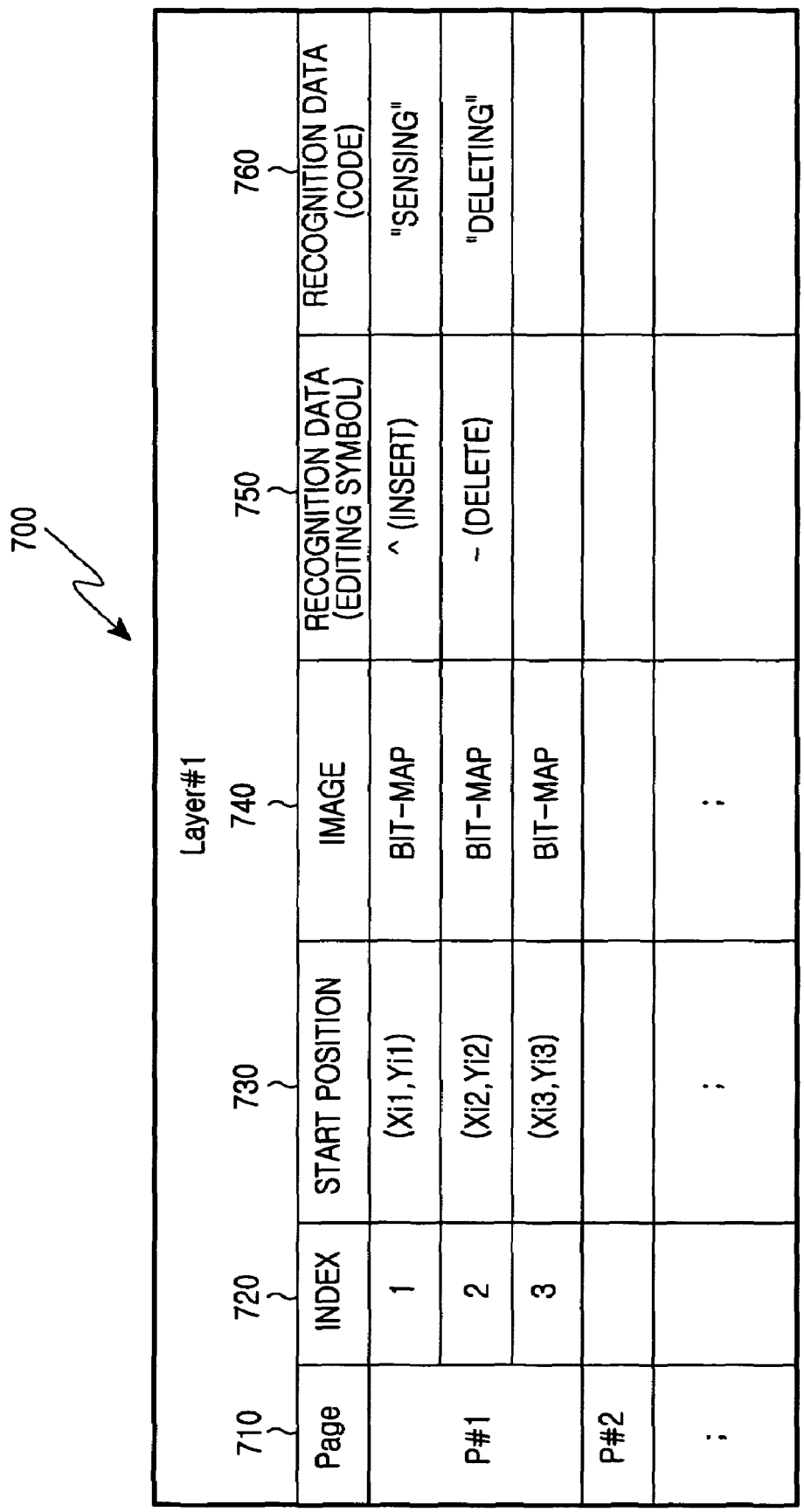
FIG. 7 shows the structure of a memory storing layers according to the embodiments of the present invention.

FIG. 7 shows the structure of a memory for storing layers according to the embodiments of the present invention. The memory 700 stores any changes to an original text having been made on a transparent layer exactly as was written by the user with a stylus on the transparent layer. Trail information 740 written by the user on a transparent layer is stored together with corresponding positional information 730 from the original text. The positional information 730 includes trail information stored as an image and the position of the trail on the transparent layer, i.e., the starting coordinate of the trail. The memory 700 assigns an index 720 to an editing symbol written by the user, and stores changes made to the original text according to their indexes. The editing apparatus then assigns a footnote number to each editing symbol at a corresponding position on the original text, and displays the change corresponding to each footnote number on the original text.

If changes were made to the original text many times, corresponding transparent layers with respective layer identifiers can be stored separately. A symbol written by the user, when recognized, is translated into computer-processible recognition data, such as an editing symbol 750 or a font symbol 760, so that only editing information can be stored. The editing information can be stored to correspond to a transparent layer. If changes were made to the original text several times, the memory 700 will store information about the time when each change was made.

According to the present invention, changes entered by writing directly on a screen displaying original text are displayed over the original text according to the trails of the handwritten entry. The user can edit original text displayed on the display screen in a similar manner to the manual editing of paper printing. In addition, according to the present invention, written symbols can be combined with original text or stored separately as footnotes, according to the results of recognizing the written symbols.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for executing a layer editing command in a pen computing system, the apparatus comprising:
   a display screen for displaying at least original text to be edited;
   a layer generating means for generating at least one transparent layer having a layer identifier in response to a layer editing command;
   a memory for storing trail information written on said display screen, and for storing positional information corresponding to said trail information; and
   a control section for accessing the at least one transparent layer from the memory in response to a user's demand, displaying said generated transparent layer sequentially and simultaneously over said original text, sensing a pen input, outputting a trail of said sensed pen input on the display screen, and storing said trail information and said positional information in said memory.

2. The apparatus according to claim 1, wherein said generated transparent layer includes the same text format as said original text.

3. The apparatus according to claim 1, wherein said trail information is stored as an image and starting coordinate of the trail, and said stored trail information and said stored corresponding positional information is accessible by searching at least one index for said at least one layer identifier.

4. The apparatus according to claim 3, wherein said control section displays more than one transparent layer sequentially over original text, thereby forming multiple layers over the original text.

5. The apparatus according to claim 3, further comprising a recognition processor for analyzing said trail information and translating said trail information into computer-processible recognition data, wherein said recognition data comprises editing symbols, font symbols, special characters, or lexigrams, and wherein said recognition data is stored separately by layer in said memory, according to said index.

6. An apparatus for executing a layer editing command in a pen computing system, the apparatus comprising:
   a display screen for displaying at least original text to be edited;
   a layer generating means for generating at least one transparent layer having a layer identifier in response to a layer editing command;
   a recognition processor for translating trail information written on said display screen into computer-processible recognition data;
   a memory for storing said trail information, corresponding positional information, and said recognition data; and
   a control section for accessing the at least one transparent layer from said memory in response to a user's demand, for displaying said generated transparent layer sequentially and simultaneously over said original text, for sensing a pen input and outputting a trail of said sensed input on said display screen, and for causing said trail information, said positional information, and said recognition data to be stored in said memory.

7. The apparatus according to claim 6, wherein said transparent layer has the same text format as the original text.

8. The apparatus according to claim 6, wherein said memory stores said generated layer according to said layer identifier, and wherein said trail information is stored as an image, said positional information is stored as the start coordinate of the trail, and said recognition data is stored according to at least one index.

9. The apparatus according to claim 8, wherein said control section compresses said image according to a predetermined compression algorithm and causes said image to be stored in said memory.

10. The apparatus according to claim 9, wherein said control section displays a plurality of transparent layers sequentially over the original text in response to a user's demand, thereby forming multiple layers over the original text.

11. The apparatus according to claim 9, wherein said transparent layer includes said trail information and said recognition data.

12. The apparatus according to claim 7, wherein said control section accesses at least one layer from said memory and generates a combined text in response to a user's demand to combine layers, and wherein said control section interprets said recognition data, executes an editing function corresponding to an editing symbol, and combines changes made to said original text to generate a new text.

13. A method of executing an editing command in a pen computing system, the method comprising the steps of:
   (a) entering a layer editing mode for editing original text displayed on a screen in response to a user's demand;
   (b) generating a transparent layer having a layer identifier;
   (c) sensing trail information generated by a pen input and corresponding positional information and displaying said trail and positional information on said transparent layer;
   (d) storing said sensed trail information and positional information according to said layer identifier; and (e) translating said trail information into computer-processible recognition data, providing for said user to review said recognition data for errors, and providing for the correction of said errors.

14. The method according to claim 13, wherein said transparent layer generated in step (b) has the same text format as said original text.

15. The method according to claim 13, wherein said step (c) further includes a process of displaying said transparent layer over said original text.

16. The method according to claim 13, wherein said step (d) further comprises simultaneously displaying more than one layer in response to said user's demand.

17. The method according to claim 13, wherein said step (e) further comprises:
   processing said sensed trail information in real-time and translating said sensed trail information into recognition data;
   classifying said recognition data as at least one of editing symbols, font characters, special characters and lexigrams; and
   storing said classified recognition data.

18. The method according to claim 13, wherein said step (e) comprises:

processing off-line said sensed trail information and translating said sensed trail information into recognition data;

classifying said recognition data as at least one of editing symbols, font characters, special characters, and lexigrams; and storing said classified recognition data.

19. The method according to claim 13, further comprising step (f) of executing an editing function according to an editing symbol, said editing symbol being determined from said recognition data, wherein said original text is changed according to said editing symbol.

20. The method according to claim 13, wherein said step (e) further comprises:

providing a separate window for inputting by said user to correct said errors.

* * * * *

UNITED STATES PATENT AND TRADEMARK OFFICE
CERTIFICATE OF CORRECTION

| | | |
|---|---|---|
| PATENT NO. | : 7,170,503 B2 | Page 1 of 1 |
| APPLICATION NO. | : 10/668625 | |
| DATED | : January 30, 2007 | |
| INVENTOR(S) | : Min-Jeong Kang et al. | |

It is certified that error appears in the above-identified patent and that said Letters Patent is hereby corrected as shown below:

In the drawings:

In FIG. 6B, the screen display should be labeled with reference numeral 100.

In FIG. 6B, the fourth line of text displayed should recite -- AND STORE -- instead of "AND SENSE STORE".

In FIG. 6B, the fourth line of text displayed should recite -- SENSE A PEN -- instead of "A PEN".

Signed and Sealed this
Sixteenth Day of February, 2016

Michelle K. Lee
*Director of the United States Patent and Trademark Office*